United States Patent
Izumi et al.

(10) Patent No.: US 11,949,261 B2
(45) Date of Patent: Apr. 2, 2024

(54) POWER SUPPLY SYSTEM

(71) Applicant: TOYOTA JIDOSHA KABUSHIKI KAISHA, Toyota (JP)

(72) Inventors: Junta Izumi, Nagoya (JP); Kenji Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/847,413

(22) Filed: Jun. 23, 2022

(65) Prior Publication Data

US 2023/0062197 A1 Mar. 2, 2023

(30) Foreign Application Priority Data

Aug. 25, 2021 (JP) .................................. 2021-136922

(51) Int. Cl.
| | |
|---|---|
| *H02J 7/00* | (2006.01) |
| *H01M 10/0525* | (2010.01) |
| *H01M 10/44* | (2006.01) |
| *H02J 1/10* | (2006.01) |
| *H02J 3/32* | (2006.01) |
| *H02M 7/217* | (2006.01) |

(52) U.S. Cl.
CPC ....... *H02J 7/0024* (2013.01); *H01M 10/0525* (2013.01); *H01M 10/441* (2013.01); *H02J 1/102* (2013.01); *H02J 3/32* (2013.01); *H02J 7/0019* (2013.01); *H02J 7/0063* (2013.01); *H02M 7/2173* (2013.01); *H02J 2207/20* (2020.01); *Y02E 60/10* (2013.01); *Y04S 10/14* (2013.01); *Y04S 20/221* (2013.01); *Y04S 20/222* (2013.01)

(58) Field of Classification Search
CPC ........ H02J 7/0063; H02J 3/14; H02J 2207/20; H02J 3/32; H02J 7/0016; H02J 7/00712; H02J 7/007194; H02J 7/34; H02J 7/342; H02J 7/0013; H02J 7/0024; H02J 7/0025; Y02E 60/10; H01M 10/441; H02M 7/483
See application file for complete search history.

(56) References Cited

U.S. PATENT DOCUMENTS

| | | | |
|---|---|---|---|
| 10,644,537 B2 * | 5/2020 | Krishnan | ............... H02J 7/0016 |
| 11,424,620 B2 * | 8/2022 | Juang | ....................... H02J 7/007 |
| 2011/0254373 A1 | 10/2011 | Johnson | |
| 2017/0267115 A1 | 9/2017 | Unno et al. | |

(Continued)

FOREIGN PATENT DOCUMENTS

| | | |
|---|---|---|
| JP | 2018-074709 A | 5/2018 |
| WO | 2017/223267 A1 | 12/2017 |
| WO | 2018/079664 A1 | 5/2018 |

OTHER PUBLICATIONS

Zumi et al.; U.S. Appl. No. 17/851,664, filed Jun. 28, 2022.

(Continued)

*Primary Examiner* — Ryan Johnson
(74) *Attorney, Agent, or Firm* — Oliff PLC

(57) ABSTRACT

A power supply system includes an alternating current sweep unit and a first power supply circuit, and each of a U-phase battery string, a V-phase battery string, a W-phase battery string, and a first battery string includes a plurality of battery circuit modules connected in series, and each of the battery circuit modules includes a battery, output terminals, a first switch, and a second switch.

6 Claims, 8 Drawing Sheets

(56) References Cited

U.S. PATENT DOCUMENTS

2017/0366038 A1* 12/2017 Qin .................... H02J 7/0068
2018/0043789 A1    2/2018 Goetz
2023/0056441 A1    2/2023 Izumi et al.
2023/0063475 A1    3/2023 Izumi et al.
2023/0068561 A1    3/2023 Izumi et al.

OTHER PUBLICATIONS

Sep. 27, 2023 Office Action issued in U.S. Appl. No. 17/851,664.
Zumi et al.; U.S. Appl. No. 17/860,554, filed Jul. 8, 2022.
Zumi et al.; U.S. Appl. No. 17/833,191, filed Jun. 6, 2022.
Jan. 16, 2024 Notice of Allowance issued in U.S. Appl. No. 17/851,664.

* cited by examiner

<< DELAY PERIOD >>

<< STOP PERIOD >>

POWER SUPPLY SYSTEM

CROSS-REFERENCE TO RELATED APPLICATION

This application claims priority to Japanese Patent Application No. 2021-136922 filed on Aug. 25, 2021, incorporated herein by reference in its entirety.

BACKGROUND

1. Technical Field

The present disclosure relates to a power supply system, in particular to a power supply system using a plurality of battery strings.

2. Description of Related Art

Japanese Unexamined Patent Application Publication No. 2018-074709 (JP 2018-074709 A) discloses a control circuit for controlling a battery string. The battery string includes a plurality of battery circuit modules connected to each other. Each battery circuit module included in the battery string includes a battery, a first switch connected in parallel to the battery, a second switch connected in series to the battery, and a first output terminal and a second output terminal to which a voltage of the battery is applied when the first switch is in an OFF state and the second switch is in an ON state. The control circuit can adjust the output voltage of the battery string to a desired magnitude by controlling the first switch and the second switch of each battery circuit module included in the battery string.

SUMMARY

JP 2018-074709 A discloses a power supply system that outputs direct current power using a battery string as described above. However, in JP 2018-074709 A, no study has been made on a power supply system that outputs alternating current power using the battery string. When it is possible that a power supply system that outputs alternating current power using the battery string is built, it can be expected that the range of applications for the battery string is expanded, and the cost of the battery string is reduced.

The present disclosure provides a power supply system that outputs alternating current power using a battery string.

A first aspect of the disclosure relates to a power supply system including an alternating current sweep unit and a first power supply circuit. The alternating current sweep unit is configured to output alternating current power from a U-phase battery string, a V-phase battery string, and a W-phase battery string that are Y-connected. The first power supply circuit is configured to convert an output of a direct current sweep unit including a first battery string into alternating current power using an inverter to output alternating current power. Each of the U-phase battery string, the V-phase battery string, the W-phase battery string, and the first battery string includes a plurality of battery circuit modules connected in series. Each of the battery circuit modules includes a battery, output terminals provided to output a voltage of the battery, a first switch connected to the output terminals and connected in parallel to the battery, and a second switch connected in series to the battery, the battery circuit modules each being configured such that the voltage of the battery is applied to the output terminals when the first switch is in an OFF state and the second switch is in an ON state. The first power supply circuit is connected to an external power supply through a first insulating filter. The alternating current sweep unit is connected to the external power supply through a second insulating filter.

According to the aspect of the present disclosure, it is possible to control the output voltage of the battery string by controlling the state of the first switch and the second switch of the battery circuit module. The U-phase battery string, the V-phase battery string, and the W-phase battery string of the alternating current sweep unit are Y-connected, and thus it is possible to output alternating current power (for example, three-phase alternating current power) by controlling the output voltage of each battery string. By converting direct current power output from the first battery string into alternating current power using the inverter, it is possible to output alternating current power from the first power supply circuit.

The alternating current power output from the first power supply circuit is noise-removed (reduced) by the first insulating filter and then supplied to the external power supply. The alternating current power output from the alternating current sweep unit is noise-removed (reduced) by the second insulating filter and then supplied to the external power supply.

In the aspect of the present disclosure, a circuit capacity of the second insulating filter may be smaller than a circuit capacity of the first insulating filter. According to the aspect of the present disclosure, it is possible for the alternating current sweep unit to set the switching cycle of the first switch and the second switch of the battery circuit module to several tens of kHz. For this reason, a sinusoidal alternating current waveform with less disturbance is output from the alternating current sweep unit, and thus it is possible to reduce the attenuation amount of the first insulating filter, and possible to reduce the circuit capacity of the first insulating filter.

According to the aspect of the present disclosure, the first power supply circuit uses the inverter to output alternating current power. It is also possible to reuse an inverter used for driving a synchronous motor of an electrified vehicle as the inverter. It is difficult for the inverter for driving the synchronous motor to generate a sinusoidal waveform equivalent to a sine wave requested by an external power supply. Even when an inverter is used that is difficult to generate a sinusoidal alternating current waveform equivalent to the sine wave requested by an external power supply, the alternating current power output from the first power supply circuit is adjusted to the sinusoidal alternating current waveform expected by the external power supply by setting the circuit capacity of the second insulating filter to a large value and increasing the attenuation amount of the second insulating filter, and thus it is possible to supply alternating current power to the external power supply.

In the aspect of the present disclosure, an output density of the battery included in the first battery string may be higher than an output density of the battery included in the U-phase battery string, the V-phase battery string, and the W-phase battery string.

According to the aspect of the present disclosure, the alternating current sweep unit is relatively inefficient since it outputs alternating current power by controlling the first switch and the second switch of the battery circuit module, and thus the maximum output (maximum power) may be suppressed. The first power supply circuit outputs alternating current power using the inverter, and thus is more efficient than the alternating current sweep unit. The battery included in the first battery string has a higher output density than that of the battery included in the U-phase battery string, the V-phase battery string, and the W-phase battery string, and thus it is possible to suitably output alternating current power from the first power supply circuit when high output is requested.

In the aspect of the present disclosure, an energy density of the battery included in the U-phase battery string, the V-phase battery string, and the W-phase battery string may be higher than an energy density of the battery included in the first battery string.

According to the aspect of the present disclosure, it is possible to suitably output alternating current power from the alternating current sweep unit when a relatively low output is requested and a long-term output is requested. This makes it possible to widely change the output characteristics of the power supply system (particularly the output power and output duration). Further, by combining a power type battery having a high output density and an energy type battery having a high energy density, it is possible to make each battery perform its specialty output (high output/long-term output). This makes it possible to provide a power supply system having a higher output and a higher capacity at a lower cost than a power supply system using an energy type battery alone or a power type battery alone.

In the aspect of the present disclosure, the battery included in the first battery string may be a nickel-metal hydride battery, and the battery included in the U-phase battery string, the V-phase battery string, and the W-phase battery string may be a lithium-ion battery.

According to the aspect of the present disclosure, in the electrified vehicle currently in widespread use, either a nickel-metal hydride battery or a lithium-ion battery is often used as a battery for storing power for traveling. Further, as battery characteristics, a nickel-metal hydride battery is generally a high-output and low-capacity type, and a lithium-ion battery is a low-output and high-capacity type. For this reason, the nickel-metal hydride battery and the lithium-ion battery used in the electrified vehicle can be reused to build the power supply system of the present disclosure.

The power supply system according to the aspect of the present disclosure may further include a control device configured to control the alternating current sweep unit and the first power supply circuit. The control device may be configured to control the alternating current sweep unit and the first power supply circuit to perform power adjustment on the external power supply by input and output power of the alternating current sweep unit and the first power supply circuit. The control device may be configured to control connection and disconnection of the alternating current sweep unit and the external power supply and connection and disconnection of the first power supply circuit and the external power supply depending on a response time and an adjustment time requested in the power adjustment.

According to the aspect of the present disclosure, it is possible to adjust the power of an external power supply by using the power supply system of the present disclosure. The connection and disconnection between the alternating current sweep unit and the external power supply and the connection and disconnection between the first power supply circuit and the external power supply are controlled depending on the response time and the adjustment time requested in the power adjustment, and thus it is possible to deal with a wide range of output power and output duration requested for the power supply system.

In the aspect of the present disclosure, the control device may be configured to operate the first power supply circuit and connect the first power supply circuit to the external power supply, when a frequency adjustment capability is requested for the power adjustment, and operate the alternating current sweep unit and connect the alternating current sweep unit to the external power supply, when a supply and demand adjustment capability is requested for the power adjustment.

According to the aspect of the present disclosure, it is possible to provide a power supply system that outputs alternating current power by using a battery string.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
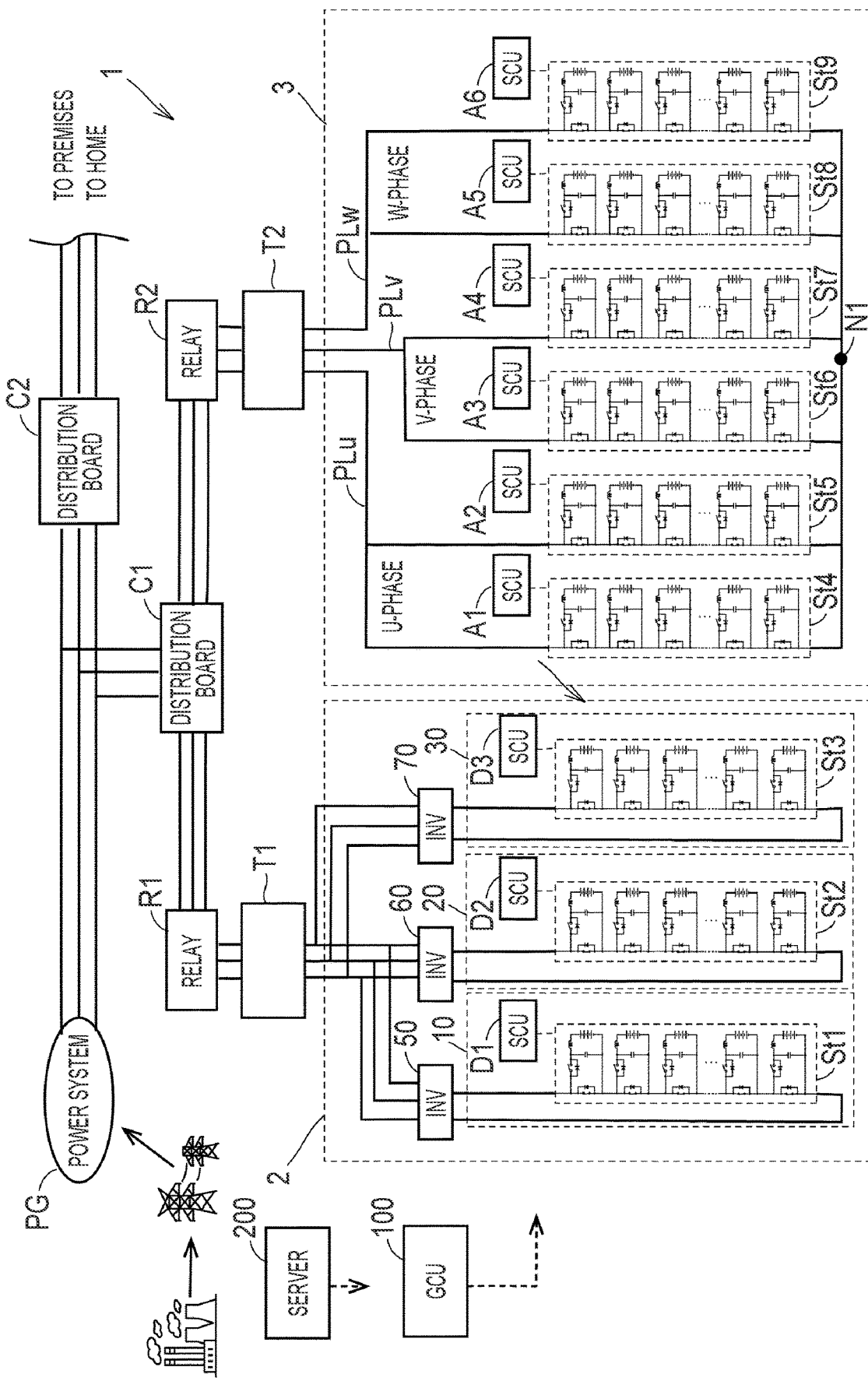
FIG. 1 is a diagram showing a configuration of a power supply system according to a present embodiment.

Hereinafter, embodiments of the present disclosure will be described in detail with reference to the drawings. In the drawings, the same or corresponding elements are denoted by the same reference numerals and descriptions thereof will not be repeated.

FIG. 1 is a diagram showing a configuration of a power supply system according to a present embodiment. The power supply system 1 includes a first power supply circuit 2, an alternating current sweep unit 3, and a group control unit (GCU) 100.

The first power supply circuit 2 includes a first direct current sweep unit 10, a second direct current sweep unit 20, a third direct current sweep unit 30, a first inverter 50, a second inverter 60, and a third inverter 70. In the present embodiment, configurations of string control units (SCUs) D1 to D3, A1 to A6, and battery strings St1 to St9, which are included in the first direct current sweep unit 10, the second direct current sweep unit 20, the third direct current sweep unit 30, and the alternating current sweep unit 3 are substantially the same, and thus the configuration will be described with reference to FIG. 2. In the following, when the battery strings St1 to St9 are not distinguished, the battery strings St1 to St9 are referred to as "battery string(s) St", and when the SCU D1 to D3 and A1 to A9 are not distinguished, SCU D1 to D3 and A1 to A9 are simply referred to as "SCU(s)". Further, a configuration including the SCU and a battery string St is referred to as a sweep unit SU.

Figure 2:
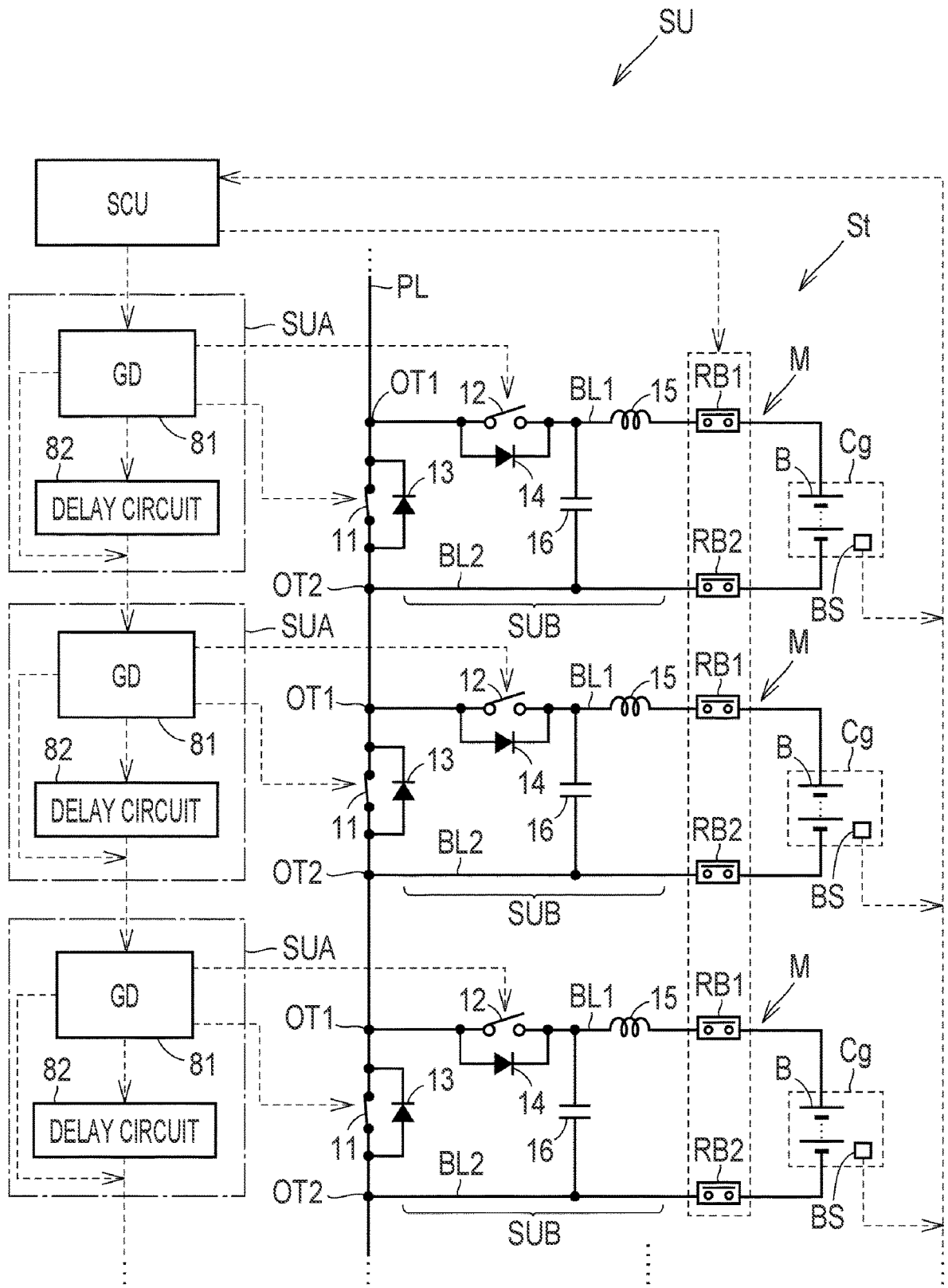
FIG. 2 is a diagram showing a configuration of a sweep unit.

FIG. 2 is a diagram showing the configuration of the sweep unit SU. The sweep unit SU includes an SCU, drive circuits SUA, and a battery string St. The battery string St includes a plurality of battery circuit modules M. In the present embodiment, the number of battery circuit modules M included in the battery string St is 22, but any number may be employed, for example, the number may be 5 to 50, or may be 100 or more. In the present embodiment, each battery string St includes the same number of battery circuit modules M, but the number of battery circuit modules M may be different for each battery string St.

Each of the battery circuit modules M includes a power circuit SUB and a cartridge Cg. The cartridge Cg includes a battery B and a monitoring unit BS. By connecting the power circuit SUB and the battery B, the battery circuit module M including the battery B is formed. The drive circuit SUA is configured to drive switches (more specifically, described later as SW 11 and SW 12) included in the battery circuit module M. The battery B may be a nickel-metal hydride rechargeable battery or a lithium-ion rechargeable battery, and the battery B may be manufactured by connecting rechargeable batteries used in an electrified vehicle in series.

As shown in FIG. 2, the battery circuit module M includes the power circuit SUB, the cartridge Cg, and circuit breakers RB1, RB2 (hereinafter, referred to as "circuit breaker RB" when the circuit breakers RB1, RB2 are not distinguished). The power circuit SUB and the cartridge Cg are connected to each other through the circuit breakers RB1, RB2. The SCU is configured to switch connection states (conduction/disconnection) between the power circuit SUB and the cartridge Cg by controlling ON/OFF of each circuit breaker RB according to a control command from the GCU 100. The circuit breaker RB may be an electromagnetic mechanical relay. The circuit breaker RB may be configured to be manually turned on and off by a user.

In the present embodiment, the cartridge Cg is configured to be detachably attached to the power circuit SUB. For example, when each of the circuit breakers RB1, RB2 is in the OFF state (disconnection state), the user may remove the cartridge Cg from the power circuit SUB. Since the battery string St can operate even without a cartridge, the user can easily increase or decrease the number of cartridges Cg contained in the battery string St. Such a battery string St is suitable for battery reuse.

In the cartridge Cg, the monitoring unit BS is configured to detect the state of the battery B (for example, voltage, current, and temperature) and output the detection result to the SCU. The monitoring unit BS includes a voltage sensor that detects the voltage of the battery B, a current sensor that detects the current of the battery B, and a temperature sensor that detects the temperature of the battery B. Further, the monitoring unit BS may be a battery management system (BMS) having a state-of-charge (SOC) estimation function, a state-of-health (SOH) estimation function, a battery voltage equalization function, a diagnostic function, and a communication function in addition to the above sensor functions. The SCU obtains the state of each battery B (for example, temperature, current, voltage, SOC, and internal resistance) based on the output of each monitoring unit BS, and outputs the obtained state of each battery B to the GCU 100.

The battery circuit module M included in the battery string St is connected by a common electric line PL. The electric line PL includes output terminals OT1, OT2 of each battery circuit module M. By connecting the output terminal OT2 of the battery circuit to the output terminal OT1 of the battery circuit adjacent to the corresponding battery circuit module M, the battery circuit modules M included in the battery string St are connected with each other.

The power circuit SUB includes a first switching element 11 (hereinafter referred to as "SW 11"), a second switching element 12 (hereinafter referred to as "SW 12"), a first diode 13, a second diode 14, and a choke coil 15, a capacitor 16, and the output terminals OT1, OT2. Each of the SW 11 and the SW 12 is driven by the drive circuit SUA. The SW 11 and the SW 12 according to the present embodiment are examples of the "first switch" and the "second switch" according to the present disclosure, respectively.

The SW 11, the capacitor 16, and the battery B are connected in parallel between the output terminals OT1, OT2 of the power circuit SUB. The SW 11 is positioned on the electric line PL and is configured to switch the connection state (conduction/disconnection) between the output terminal OT1 and the output terminal OT2. The output terminal OT1 is connected to the positive electrode of the battery B through an electric line BL1, and the output terminal OT2 is connected to the negative electrode of the battery B through an electric line BL2. The circuit breakers RB1, RB2 are provided on the electric lines BL1, BL2, respectively. The electric line BL1 is further provided with the SW 12 and the choke coil 15. In a battery circuit BC, the voltage of the battery B is applied between the output terminals OT1, OT2 when the SW 12 connected in series with the battery B is in the ON state (connection state) and the SW 11 connected in parallel to the battery B is in the OFF state (disconnection state).

The capacitor 16 connected to the electric line BL1 and the electric line BL2 is provided between the output terminals OT1, OT2 and the battery B. One end of the capacitor 16 is connected to the electric line BL1 between the SW 12 and the choke coil 15. The capacitor 16 smooths the voltage of the battery B and outputs the smoothed voltage between the output terminals OT1, OT2.

Each of the SW 11 and the SW 12 is, for example, a field effect transistor (FET). The first diode 13 and the second diode 14 are connected in parallel to the SW 11 and the SW 12, respectively. The SW 12 is positioned between the output terminal OT1 and the choke coil 15. The choke coil 15 is positioned between the SW 12 and the positive electrode of the battery B. An RCL filter is formed by the battery B, the choke coil 15, and the capacitor 16. Current leveling is achieved by the RCL filter. Each of the SW 11 and the SW 12 is not limited to the FET, and may be a switch other than the FET.

The SCU generates a gate signal according to a control command from the GCU 100. The drive circuit SUA is provided for each battery circuit module M, and includes a gate driver (GD) 81 that drives the SW 11 and the SW 12 according to the gate signal, and a delay circuit 82 that delays the gate signal. ON/OFF of each of SW 11 and SW 12 included in the battery circuit module M is controlled according to the gate signal.

Figure 3:
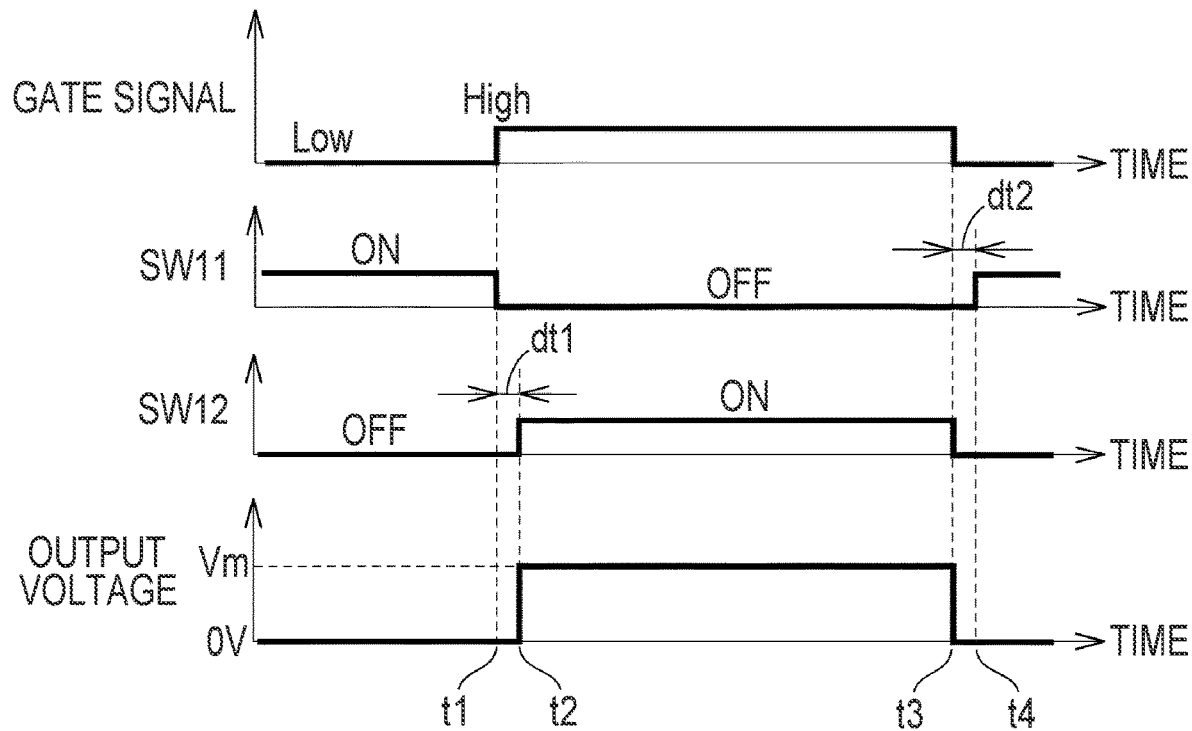
FIG. 3 is a time chart showing an example of an operation of a battery circuit module controlled by a gate signal.

FIG. 3 is a time chart showing an example of the operation of the battery circuit module M controlled by a gate signal. In the present embodiment, a rectangular wave signal is employed as the gate signal for driving the SW 11 and the SW 12. "Low" and "High" of the gate signal shown in FIG. 3 mean an L level and an H level of the gate signal (rectangular wave signal), respectively. Further, an "output voltage" means a voltage output between the output terminals OT1, OT2.

In an initial state of the battery circuit module M, no gate signal is input to the drive circuit SUA (gate signal=L level), and the SW 11 and the SW 12 are in the ON state and the OFF state, respectively.

When a gate signal is input to the drive circuit SUA, the GD 81 drives the SW 11 and the SW 12 according to the input gate signal. In the example shown in FIG. 3, at a timing t1, the gate signal rises from the L level to the H level, and the SW 11 is switched from the ON state to the OFF state at the same time as the rise of the gate signal. Then, the SW 12 is switched from the OFF state to the ON state at a timing t2, which is delayed by a predetermined time (hereinafter, referred to as "dt1") from the rise of the gate signal. In this way, the battery circuit module M is put into a driven state. Hereinafter, the period until the elapse of dt1 from the rise of the gate signal is also referred to as a "first delay period".

Figure 4:
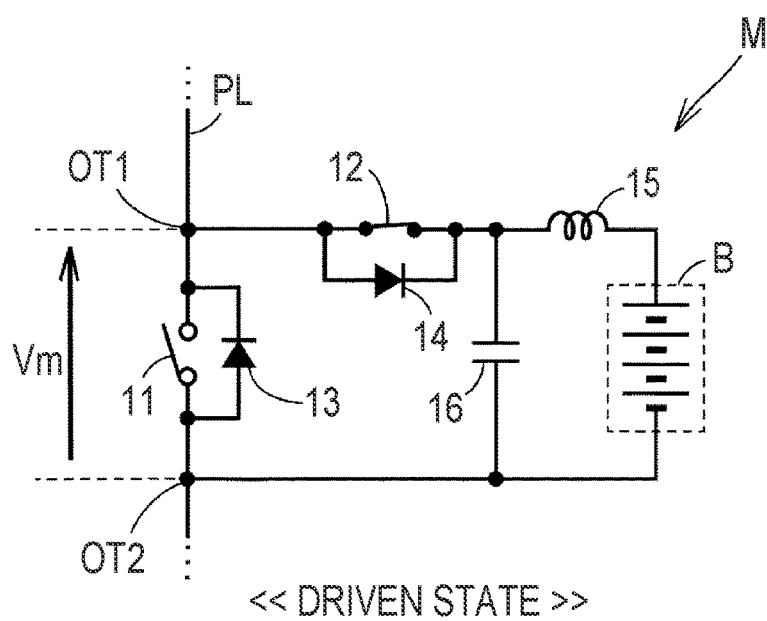
FIG. 4 is a diagram showing the battery circuit module in an operating state.

FIG. 4 is a diagram showing the battery circuit module M in a driven state. In the battery circuit BC in the driven state, the voltage of the battery B is applied between the output terminals OT1, OT2 when the SW 11 is turned off and the SW 12 is turned on. When the voltage of the battery B is applied between the output terminals OT1, OT2 through the capacitor 16, a voltage Vm is output between the output terminals OT1, OT2.

Referring to FIG. 3, when the gate signal falls from the H level to the L level at a timing t3, the SW 12 is switched from the ON state to the OFF state at the same time as the fall of the gate signal. In this way, the battery circuit module M is put into a stopped state. In the battery circuit module M in the stopped state, the voltage of the battery B is not applied between the output terminals OT1, OT2 when the SW 12 is turned off. Then, the SW 11 is switched from the OFF state to the ON state at a timing t4, which is delayed by a predetermined time (hereinafter, referred to as "dt2") from the fall of the gate signal. dt1 and dt2 may be the same as or different from each other. In the present embodiment, each of dt1 and dt2 is set to 100 nsec. Note that each of dt1 and dt2 can be set to any value.

Hereinafter, the period until the elapse of dt2 from the fall of the gate signal is also referred to as a "second delay period". Further, the period from when the second delay period ends until the battery circuit module M is put into an operating state is also referred to as a "stop period".

Figure 5:
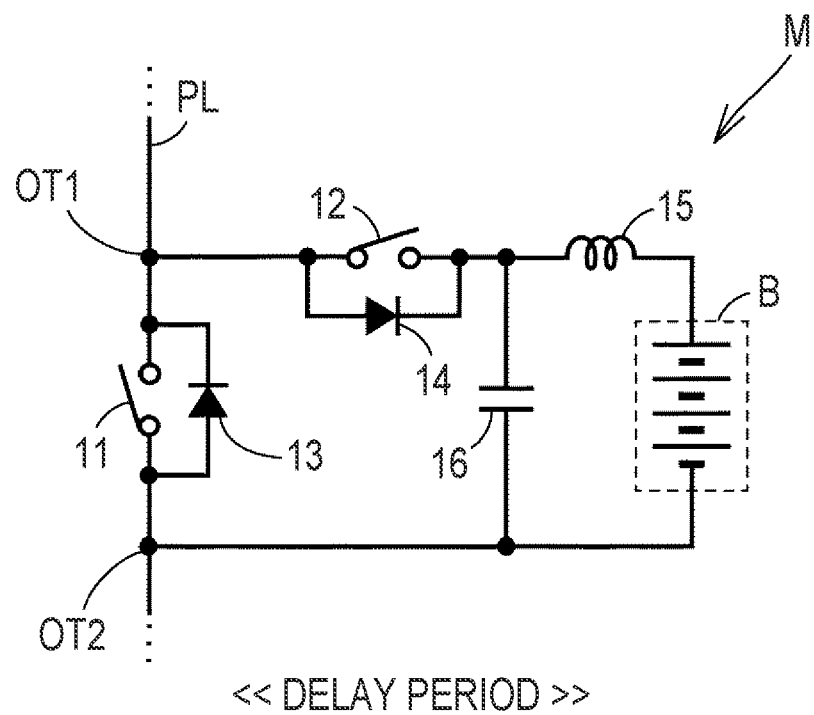
FIG. 5 is a diagram showing a state of the battery circuit module during a delay period.

FIG. 5 is a diagram showing a state of the battery circuit module M during a delay period. As shown in FIG. 5, both the SW 11 and the SW 12 are turned off in each of the first delay period and the second delay period.

Figure 6:
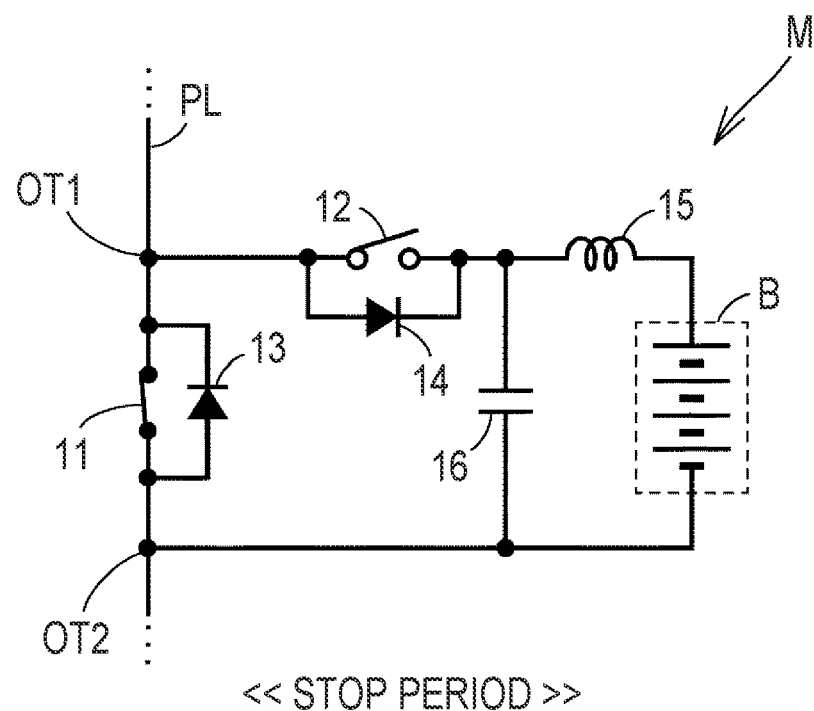
FIG. 6 is a diagram showing a state of the battery circuit module during a stop period.

FIG. 6 is a diagram showing a state of the battery circuit module M during a stop period. As shown in FIG. 6, during the stop period, the SW 11 is turned on and the SW 12 is turned off, as in the initial state.

The battery circuit module M is in the stopped state in both the delay period and the stop period. In the battery circuit module M in the stopped state, no voltage is applied between the output terminals OT1, OT2. By setting the first delay period and the second delay period the simultaneous turn-on of the SW 11 and the SW 12 (that is, the battery circuit module M being short-circuited) is suppressed.

By controlling the battery circuit modules M included in the battery string St as described above, it is possible to adjust the number of the battery circuit modules M in the driven state, which makes it possible to control the output voltage of the battery string St. In this way, the sweep unit SU is configured to output a voltage from 0 V to the sum of the voltages of respective batteries B included in the battery string St.

Figure 7:
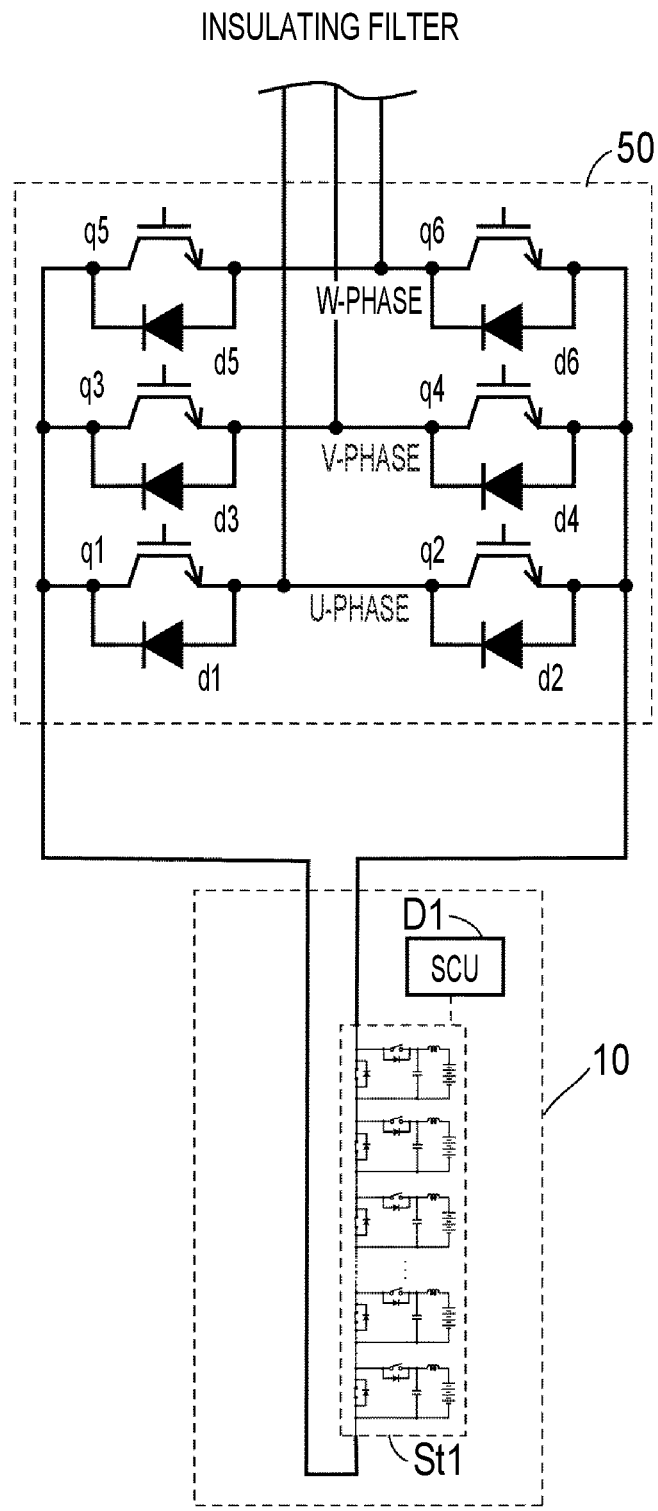
FIG. 7 is a diagram showing a configuration of a first inverter.

Referring to FIG. 1, the first direct current sweep unit 10 is a sweep unit SU configured as described above, and includes the battery string St1 and the SCU D1. The battery B of the battery circuit module M included in the battery string St1 is a nickel-metal hydride rechargeable battery. The direct current power output from the first direct current sweep unit 10 is input to the first inverter 50. FIG. 7 is a diagram showing a configuration of the first inverter 50. The first inverter 50 is a three-phase inverter, and includes switching elements q1, q2 connected in series in a U-phase arm, the switching elements q3 and q4 connected in series in a V-phase arm, and switching elements q5 and q6 connected in series in a W-phase arm. Diodes d1 to d6 are connected in antiparallel between collectors and the emitters of respective switching elements q1 to q6.

An intermediate point of each phase arm of the first inverter 50 is connected to an insulating filter T1 and further connected to a power system PG through a relay R1 and a distribution board C1 (see FIG. 1). Each of the switching elements q1 to q6 of the first inverter 50 is turned on/off by a control command from the GCU 100, for example, by pulse width modulation (PWM) control. The first inverter 50 converts the direct current power output from the first direct current sweep unit 10 into alternating current power (three-phase alternating current power) and supplies the alternating current power to the power system PG. Further, the first inverter 50 converts the alternating current power (three-phase alternating current power) supplied from the power system PG into direct current power and supplies the direct current power to the first direct current sweep unit 10 to charge the battery B of the battery string St1. In the present embodiment, the three-phase inverter used to drive the three-phase synchronous motor of the electrified vehicle is reused for the first inverter 50.

In FIG. 1, the second direct current sweep unit 20 including the battery string St2 and SCU D2 and the third direct current sweep unit 30 including the battery string St3 and SCU D3 have the same configuration as the first direct current sweep unit 10. The second inverter 60 connected to the second direct current sweep unit 20 and the third inverter 70 connected to the third direct current sweep unit 30 have the same configuration as the first inverter 50. The intermediate points of the phase arms of the first inverter 50, the second inverter 60, and the third inverter 70 are connected by power lines. The first direct current sweep unit 10, the second direct current sweep unit 20, and the third direct current sweep unit 30 are (electrically) connected in parallel with the insulating filter T1. In this way, the first power supply circuit 2 outputs alternating current power (three-phase alternating current power) from the first direct current sweep unit 10, the second direct current sweep unit 20, and the third direct current sweep unit 30 (using first to third inverters 50, 60, 70), which are connected in parallel to each other.

Figure 8:
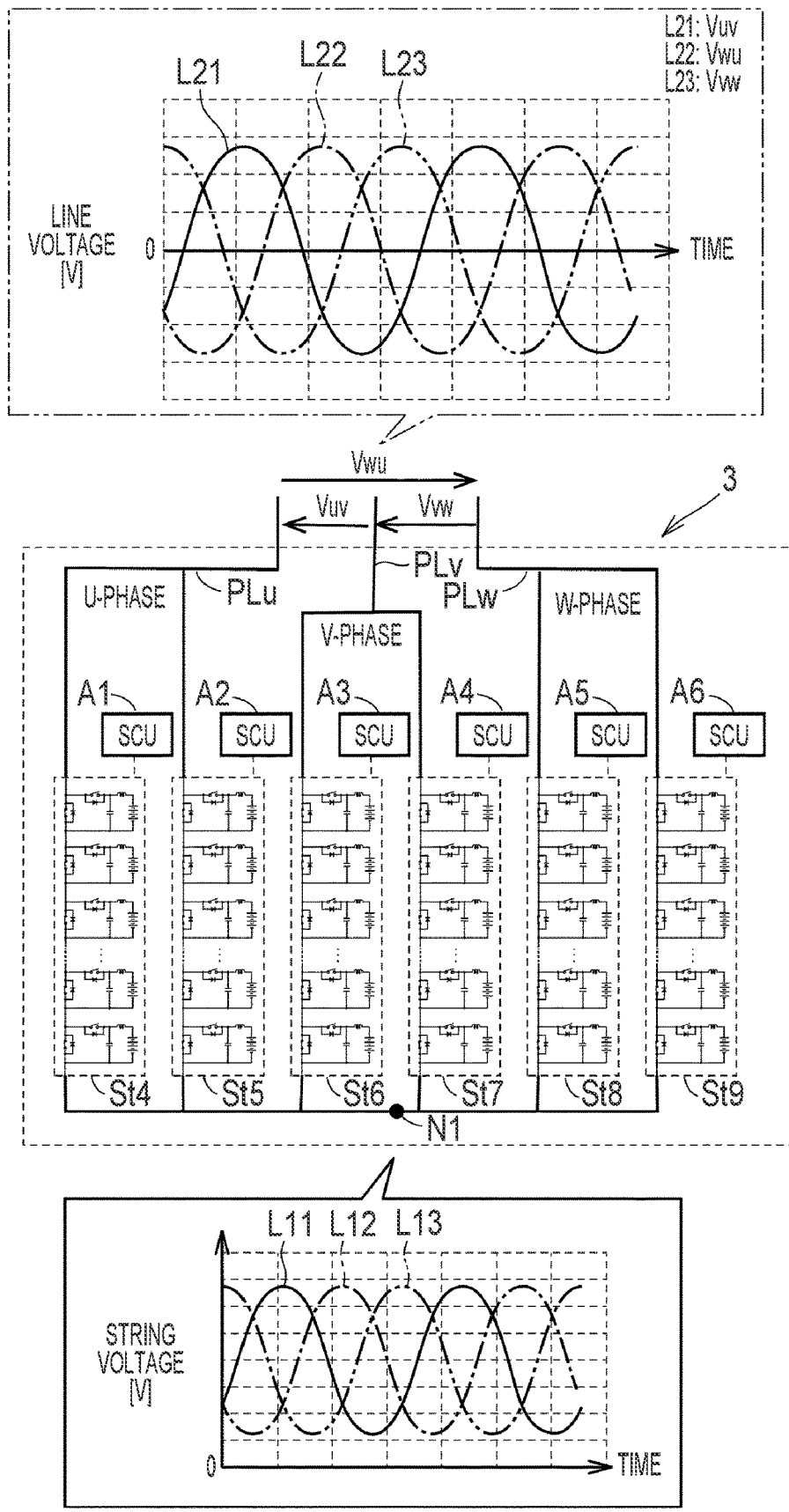
FIG. 8 is a diagram showing a configuration of an alternating current sweep unit.

FIG. 8 is a diagram showing a configuration of the alternating current sweep unit 3. A configuration of a first U-phase battery string St4 and an SCU A1 is substantially the same as that of the sweep unit SU described with reference to FIG. 2. The same applies to "a second U-phase battery string St5 and an SCU A2", "a first V-phase battery string St6 and an SCU A3", "a second V-phase battery strings St7 and an SCU A4", "a first W-phase battery string St8 and an SCU A5", and "a second W-phase battery string St9 and an SCU A6".

In the present embodiment, the batteries B of the battery circuit modules M included in the first U-phase battery string St4, the first V-phase battery string St6, and the first W-phase battery string St8 are ternary system (NMC) lithium-ion rechargeable batteries. Further, the batteries B of the battery circuit modules M included in the second U-phase battery string St5, the second V-phase battery string St7, and the second W-phase battery string St9 are iron phosphate-based (LFP) lithium-ion rechargeable batteries.

In FIG. 8, positive electrode terminals of the first U-phase battery string St4 and the second U-phase battery string St5 are connected to a power line PLu. Positive electrode terminals of the first V-phase battery string St6 and the second V-phase battery string St7 are connected to a power line PLv. Positive electrode terminals of the first W-phase battery string St8 and the second W-phase battery string St9 are connected to a power line PLw. Further, negative electrode terminals of the battery strings St4 to St9 are connected to a neutral point N1. In this way, the alternating current sweep unit 3 has a configuration in which "the first U-phase battery string St4 and the second U-phase battery string St5 that are connected in parallel", "the first V-phase battery string St6 and the second V-phase battery string St7 that are connected in parallel", and "the first W-phase battery string St8 and the second W-phase battery string St9 that are connected in parallel" are Y-connected.

The SCUs A1 to A6 control the SWs 11 and the SWs 12 of respective battery circuit modules M at a switching frequency of several tens of kHz by the control command from the GCU 100, thereby controlling string voltages (output voltages) of respective battery strings St4 to St9 to have a voltage waveform shown at the lower portion of FIG. 8. In FIG. 8, a line L11 is a string voltage of the first U-phase battery string St4 and the second U-phase battery string St5. A line L12 is a string voltage of the first V-phase battery string St6 and the second V-phase battery string St7. A line L13 is a string voltage of the first W-phase battery string St8 and the second W-phase battery string St9. The line L11, the line L12, and the line L13 are sine waves that are 120° out of phase and have a frequency of 60 Hz.

By controlling the string voltage of each of the battery strings St4 to St9 as described above, line voltages of the power lines PLu, PLv, PLw have voltage waveforms shown in the upper portion of FIG. 8. In FIG. 8, a line L21 indicates a line voltage "Vuv" between the power line PLu and the power line PLv, a line L22 indicates a line voltage "Vwu" between the power line PLw and the power line PLu, and a line L23 indicates a line voltage "Vvw" between the power line PLv and the power line PLw. Each line voltage has a sinusoidal alternating current waveform with periodical changing polarity (positive/negative). In this way, alternating current power (three-phase alternating current power) is output from the alternating current sweep unit 3.

Referring to FIG. 1, the alternating current power output from the first power supply circuit 2 is supplied to the power system PG through the insulating filter T1, the relay R1, and the distribution board C1. The alternating current power output from the alternating current sweep unit 3 is supplied to the power system PG through the insulating filter T2, a relay R2, and the distribution board C1. The power system PG is an example of the "external power supply" of the present disclosure.

The insulating filter T1 and the insulating filter T2 include, for example, an LCL filter (LC filter) and a three-phase transformer. The insulating filter T1 and the insulating filter T2 reduce the noise component of the three-phase alternating current by the LCL filter, convert the three-phase alternating current power to a predetermined voltage (for example, 200 V) by the three-phase transformer, and insulate the input side and the output side.

Figure 9:
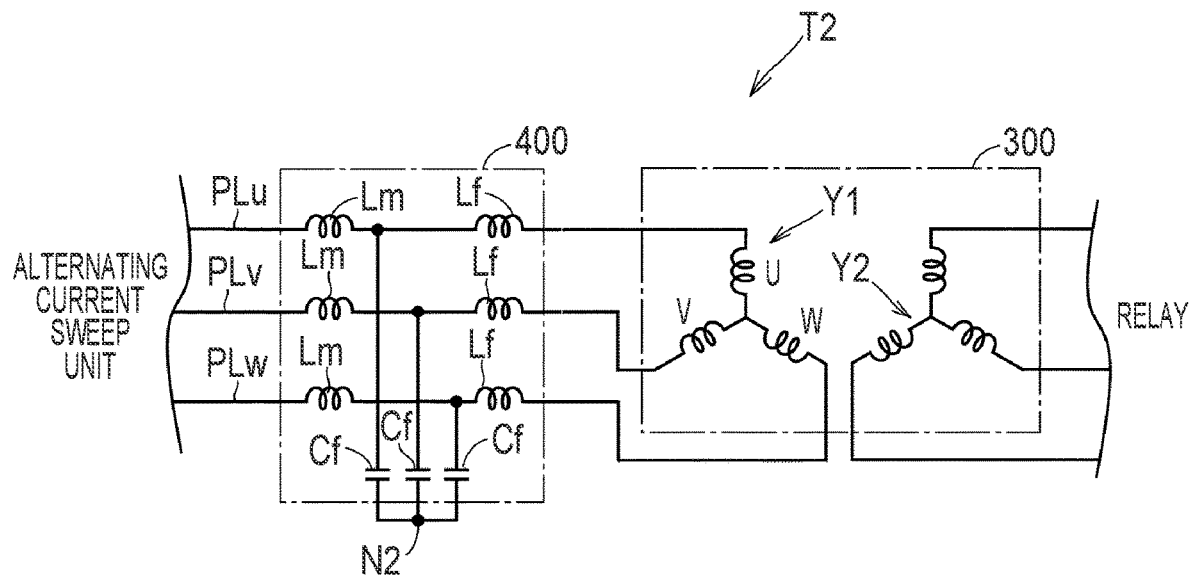
FIG. 9 is a diagram showing an example of an insulating filter.

FIG. 9 is a diagram showing an example of the insulating filter T2. The insulating filter T2 includes a three-phase transformer 300 and an LCL filter 400. The three-phase transformer 300 includes a three-phase coil Y1 closer to the Y-connected alternating current sweep unit 3 and a three-phase coil Y2 closer to the Y-connected relay R2 (power system PG). The three-phase coil Y1 includes a U-phase coil, a V-phase coil, and a W-phase coil. First ends of the U-phase coil, the V-phase coil, and the W-phase coil are connected to the power line PLu, the power line PLv, and the power line PLw, respectively, through the LCL filter 400. A second end of each coil is commonly connected to a neutral point. The three-phase coil Y2 is connected to the power system through the relay R2 and a distribution board C2. The three-phase transformer 300 converts, for example, the three-phase alternating current power output from the alternating current sweep unit 3 into a predetermined voltage (for example, 200 V) and supplies the converted power to the power system PG Further, the three-phase transformer 300 insulates the alternating current sweep unit 3 side from the power system PG side.

The LCL filter 400 is a low-pass filter and includes a reactor Lm, a capacitor Cf, and a reactor Lf provided in each of the power lines PLu, PLv, and PLw. The capacitor Cf provided in each of the power lines PLu, PLv, and PLw is connected to a neutral point N2.

The insulating filter T1 includes a three-phase transformer and an LCL filter like the insulating filter T2, and thus the illustration thereof is omitted. Note that the LCL filter included in the insulating filter T1 has a larger circuit capacity than the LCL filter 400 included in the insulating filter T2. Here, the circuit capacity of the LCL filter (so-called T-type filter) is the sum of the L values of the reactor Lm and the reactor Lf and the C value of the capacitor Cf.

The alternating current sweep unit 3 controls the SWs 11 and the SWs 12 of the battery circuit modules M with a switching cycle of several tens of kHz, thereby generating alternating current power (three-phase alternating current power). The alternating current sweep unit 3 outputs a sinusoidal alternating current waveform with less disturbance, and thus, even if the attenuation amount of the insulating filter T2 is small, the alternating current waveform output from the alternating current sweep unit 3 can be adjusted and supplied to the power system PG.

When the three-phase inverter used for driving the three-phase synchronous motor of the electrified vehicle is reused as the first to third inverters 50 to 70 used in the first power supply circuit 2, the above-mentioned inverter is not manufactured to output the sine wave requested by the power system PG Therefore, it may not be possible to output a clean waveform equivalent to the sinusoidal alternating current waveform expected by the power system PG In a low-pass filter including a reactor (inductor) and a capacitor, at frequencies of 100 kHz or less, the larger the L value of the reactor or the C value of the capacitor, the larger the attenuation amount. In the present embodiment, the L value and C value of the LCL filter included in the insulating filter T1 are made larger than the L value and C value of the LCL filter 400 included in the insulating filter T2 (circuit capacity of the insulating filter T1 is made larger than the circuit capacity of the insulating filter T2), and the attenuation amount of the insulating filter T1 is increased. In this way, alternating current power output from the first power supply circuit 2 is adjusted to the sinusoidal alternating current waveform expected by the power system PG, and the adjusted alternating current power is supplied to the power system PG.

Figure 10:
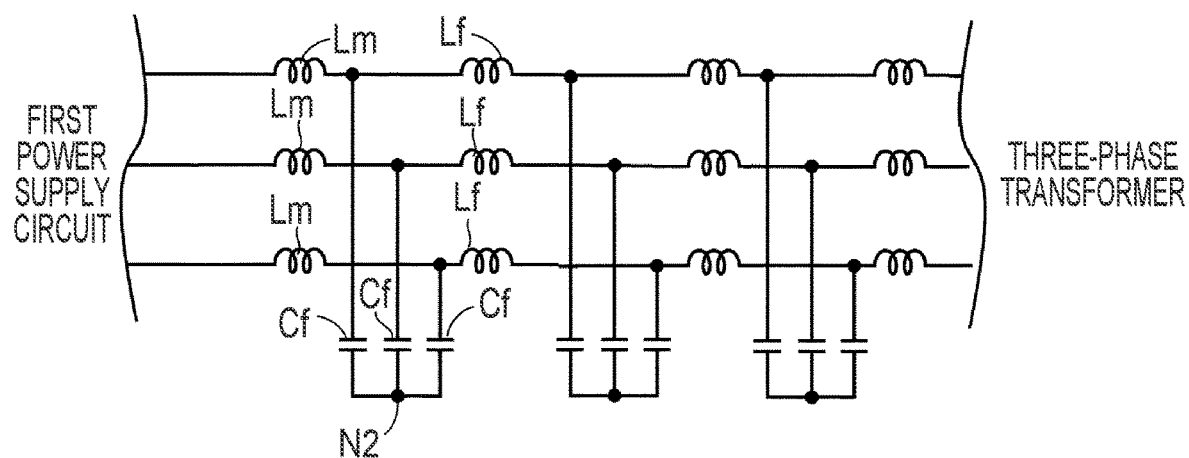
FIG. 10 is a diagram showing another example of the insulating filter.

FIG. 10 is a diagram showing another example of the insulating filter T1. By increasing the number of stages of the LC filter, steep frequency characteristics can be obtained and noise can be removed more. In the insulating filter T1 shown in FIG. 10, a 7-stage LC filter is used. By increasing the number of stages of the LC filter (increasing the circuit capacity of the insulating filter T1) as described above and increasing the attenuation amount using the steep frequency characteristics of the insulating filter T1, alternating current power output from the first power supply circuit 2 may be adjusted to the sinusoidal alternating current waveform expected by the power system PG and the alternating current power may be supplied to the power system PG.

Referring to FIG. 1, the relay R1 and the relay R2 may be electromagnetic mechanical relays. By controlling the ON/OFF of the relay R1 by the GCU 100, connection (parallel) and disconnection (off) of the first power supply circuit 2 and the power system PG is made. Further, the GCU 100 controls ON/OFF of the relay R2, thereby connecting/disconnecting the alternating current sweep unit 3 and the power system PG.

The distribution board C1 is provided with an earth-leakage circuit breaker or a breaker, and when the batteries B of the battery string St included in the first power supply circuit 2 and the alternating current sweep unit 3 are charged, the power of the power system PG is distributed to the first power supply circuit 2 and the alternating current sweep unit 3. Further, the distribution board C1 supplies the power output from the first power supply circuit 2 and the alternating current sweep unit 3 to the power system PG.

When the batteries B of the battery strings St included in the first power supply circuit 2 are charged, the batteries B are charged by converting the alternating current power supplied from the power system PG into direct current power by the first to third inverters 50 to 70. When the batteries B of the battery strings St included in the alternating current sweep unit 3 are charged, the batteries B are charged by the SCUs A1 to A6 controlling the SWs 11 and the SWs 12 such that the voltage of the battery string St is slightly lower than the alternating current voltage supplied from the power system PG.

The alternating current power of the first power supply circuit 2 and the alternating current power of the alternating current sweep unit 3, which are supplied to the power system PG, are supplied to the line in the premises or the home through the distribution board C2 together with the alternating current power of the power system PG.

The server 200 manages the supply and demand of the power system PG (power grid) provided by a power company (power generation company and power transmission and distribution company). The server 200 is configured to be communicable with the GCU 100, and requests the GCU 100 to adjust the power of the power system PG as requested. Upon receiving the request from the server 200, the GCU 100 controls the SUCs of the sweep unit SU, the first to third inverters 50 to 70, the relay R1, and the relay R2 to adjust input and output power of the first power supply circuit 2 and the alternating current sweep unit 3.

Figure 11:
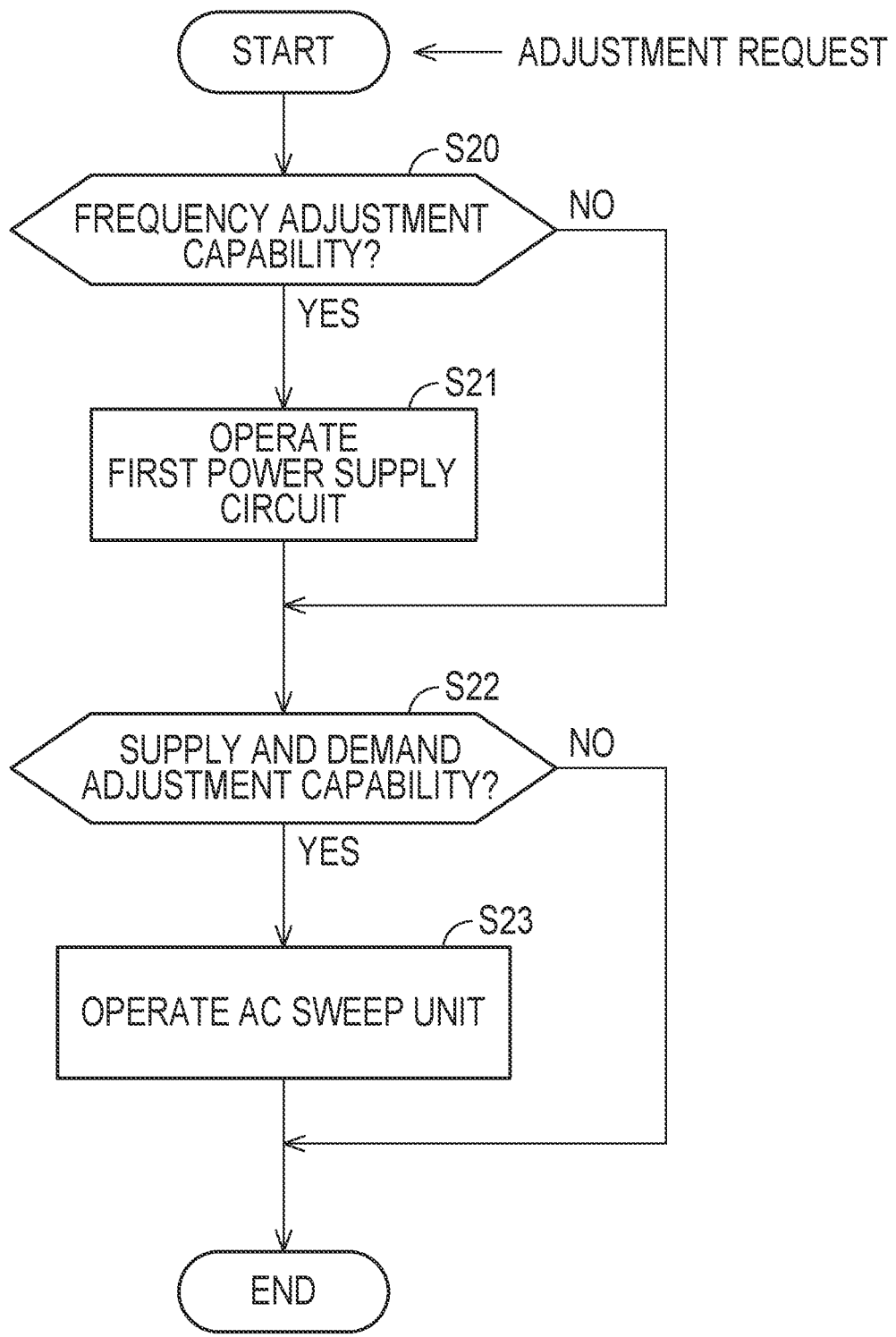
FIG. 11 is a flowchart showing an example of a process executed by a GCU when a power adjustment request is made from a server.

FIG. 11 is a flowchart showing an example of a process executed by the GCU 100 when a power adjustment request is made from the server 200. The flowchart is executed when the GCU 100 receives an adjustment request from the server 200. An adjustment capability requested from the server 200 is an electric power amount with which an output, such as a generator output, for suppressing frequency fluctuation and supply-demand imbalance is adjustable, and is roughly classified into a frequency adjustment capability and a supply and demand adjustment capability. The frequency adjustment capability is governor-free or load frequency control (LFC) for adjusting an output to the frequency fluctuation from seconds to minutes, and the supply and demand adjustment capability is economic load dispatching control (EDC) for reducing the imbalance between supply and demand of electricity over a long period of minutes or longer. As for the frequency adjustment capability, the output change (response time) up to the command value is fast, and the output duration is relatively short. As for the supply and demand adjustment capability, the response time is slow and the output duration is relatively long.

Referring to FIG. 11, in step 20 (hereinafter, step is abbreviated as "S"), the GCU 100 determines whether or not the adjustment request is a frequency adjustment capability. When the adjustment request is the frequency adjustment capability and an affirmative determination is made, the process proceeds to S21. When the frequency adjustment capability is not requested, a negative determination is made and the process proceeds to S22.

In S21, the GCU 100 operates the first power supply circuit 2. The GCU 100 connects the first power supply circuit 2 and the power system PG (in parallel) with the relay R1 turned on. When the adjustment request is a suppressed demand response (DR), the GCU 100 controls the SWs 11 and the SWs 12 of the battery strings St1 to St3 by the SCUs D1 to D3, thereby outputting direct current power from the first direct current sweep unit 10, the second direct current sweep unit 20, and the third direct current sweep unit 30. The GCU 100 converts the direct current power into alternating current power using the first to third inverters 50 to 70, and supplies the alternating current power (three-phase alternating current power) to the power system PG When the adjustment request is an increased DR, the GCU 100 converts the alternating current power of the power system PG into direct current power by using the first to third inverters 50 to 70. The GCU 100 controls the SWs 11 and the SWs 12 of the battery strings St1 to St3 by SCUs D1 to D3, thereby appropriately charging the batteries B included in the first direct current sweep unit 10, the second direct current sweep unit 20, and the third direct current sweep unit 30. After S21, the process proceeds to S22.

In S22, the GCU 100 determines whether or not the adjustment request is a supply and demand adjustment capability. When the adjustment request is the supply and demand adjustment capability and an affirmative determination is made, the process proceeds to S23. When the frequency adjustment capability is not requested, negative determination is made and the current routine ends.

In S23, the GCU 100 operates the alternating current sweep unit 3. That is, the GCU 100 connects the alternating current sweep unit 3 and the power system PG (in parallel) with the relay R2 turned on. When the adjustment request is a suppressed demand response (DR), the GCU 100 controls the SWs 11 and the SWs 12 of the battery strings St4 to St9 by the SCUs A1 to A6, thereby outputting alternating current power (three-phase alternating current power) from the alternating current sweep unit 3. When the adjustment request is an increased DR, the GCU 100 controls the SWs 11 and the SWs 12 by SCUs A1 to A6 such that the voltage of the battery strings St is slightly lower than the alternating current voltage supplied from the power system PG to appropriately charge the batteries B of the battery strings St included in the alternating current sweep unit 3.

The adjustment capability treated in the supply and demand adjustment market is divided into a primary adjustment capability, a secondary adjustment capability (1), a secondary adjustment capability (2), a tertiary adjustment capability (1), and a tertiary adjustment capability (2) in the order of the fast output change (response time) up to the command value and the shortest output duration. The governor-free, which is an example of the primary adjustment capability, increases or decreases the output in response to a change in the system frequency, and the LFC, which is an example of the secondary adjustment capability (1), adjusts the frequency fluctuation caused by the load fluctuation. The EDC, which is an example of the secondary adjustment capability (2) and the tertiary adjustment capability (1), distributes output to the generator to be the most economical. The tertiary adjustment capability (2) is positioned as the adjustment capability of the low speed frame. For this reason, when the requested adjustment capability is the primary adjustment capability and the secondary adjustment capability (1), the adjustment request may be treated as the frequency adjustment capability, and when the requested adjustment capability is the other adjustment capability, the adjustment request may be treated as the supply and demand adjustment capability.

The batteries B of the battery strings St of the first direct current sweep unit 10, the second direct current sweep unit 20, and the third direct current sweep unit 30 included in the first power supply circuit 2 are nickel-metal hydride rechargeable batteries. The batteries B of the battery strings St of the alternating current sweep unit 3 are lithium-ion rechargeable batteries. Due to the battery characteristics, the output density (W/kg) of the nickel-metal hydride rechargeable battery is larger than the output density of the lithium-ion rechargeable battery. Further, the energy density (Wh/kg) of the lithium-ion rechargeable battery is higher than the energy density of the nickel-metal hydride rechargeable battery. For this reason, the nickel-metal hydride rechargeable battery is located in the upper left region of the Ragone plot and can be said to be a power type (output type) battery. Further, the lithium-ion rechargeable battery is located in the lower right region of the Ragone plot and can be said to be an energy type (capacity type) battery.

In the alternating current sweep unit 3, the SWs 11 and the SWs 12 of the battery strings St are controlled at several tens of kHz to output alternating current power, which makes the efficiency low (low efficiency), and thus it is desirable to suppress the maximum output (maximum power). For this reason, in order to increase the output (power (W)) of the alternating current sweep unit 3, it is needed to increase the number of battery strings St in parallel, which leads to an increase in cost. For this reason, it is preferable that the batteries B of the battery strings St of the alternating current sweep unit 3 are charged and discharged at a low rate for use. Therefore, it is desirable that the batteries B of the battery strings St of the alternating current sweep unit 3 are energy type batteries having a large energy density, and in the present embodiment, lithium-ion rechargeable batteries are used.

On the other hand, in the first power supply circuit 2, alternating current power is output by using inverters, which leads to a relatively high efficiency, and thus it is possible to increase the maximum output. Therefore, a large output (power (W)) can be output from the first power supply circuit 2 by using the power type batteries having a large output density as the batteries B of the battery strings St of the first power supply circuit 2 (batteries B of the battery strings St of the first direct current sweep unit 10, the second direct current sweep unit 20, and the third direct current sweep unit 30), and as a result, nickel-metal hydride rechargeable batteries are used in the present embodiment.

According to the example of FIG. 11, for the frequency adjustment capability that requests a fast response time and high responsiveness, the GCU 100 responds to the adjustment request by operating the first power supply circuit 2. The batteries B of the battery strings St of the first power supply circuit 2 (battery strings St of the first to third direct current sweep units 10 to 30) are (power type) nickel-metal hydride rechargeable batteries having a high output density, which makes it possible to suitably suppress frequency fluctuations. The supply and demand adjustment capability requests a power supply system with a long adjustment time and a relatively large capacity. For a demand adjustment capability that requests a long adjustment time and a large capacity, the GCU 100 responds to the adjustment request by operating the alternating current sweep unit 3. Since the batteries B of the battery strings St of the alternating current sweep unit 3 are lithium-ion rechargeable battery having a high energy density (capacity type), it is possible to suitably meet the demand adjustment. As described above, according to the example of FIG. 11, the connection and disconnection of the power system PG and the alternating current sweep unit 3, and the connection and disconnection of the power system PG and the first power supply circuit 2 are controlled depending on the response time and the adjustment time requested in the power adjustment.

According to the present embodiment, the outputs of the first to third direct current sweep units 10 to 30 are converted into alternating current power by using the first to third inverters 50 to 70. The alternating current power output from the first power supply circuit 2 that outputs the alternating current power has a noise component removed (reduced) by the insulating filter T1, converted into a predetermined voltage, and supplied to the power system PG Further, the alternating current power of the alternating current sweep unit 3 that outputs alternating current power from the first and second U-phase battery strings St4 and St5, the first and second V-phase battery strings St6 and St7, and the first and second W-phase battery strings St8 and St 9, which are Y-connected, has a noise component removed (reduced) by the insulating filter T2, converted into a predetermined voltage, and supplied to the power system PG.

The circuit capacity of the insulating filter T2 is smaller than the circuit capacity of the insulating filter T1. The alternating current sweep unit 3 controls the SWs 11 and the SWs 12 of the battery circuit modules M with a switching cycle of several tens of kHz, thereby generating alternating current power (three-phase alternating current power). The alternating current sweep unit 3 outputs a sinusoidal alternating current waveform with less disturbance, and thus, even if the circuit capacity of the insulating filter T2 is small and the attenuation amount thereof is small, the alternating current waveform output from the alternating current sweep unit 3 can be adjusted and supplied to the power system PG.

When an inverter is used that is not manufactured for outputting a sine wave requested by the power system PG for example, when the three-phase inverter used to drive the three-phase synchronous motor of the electrified vehicle is reused as the inverter of the first power supply circuit 2, it may not be possible to output a clean waveform equivalent to the sinusoidal alternating current waveform expected by the power system PG The circuit capacity of the insulating filter T1 is larger than the circuit capacity of the insulating filter T2, and the attenuation amount thereof is large. For this reason, it is possible to adjust alternating current power output from the first power supply circuit to the sinusoidal alternating current waveform expected by the power system PG and to supply the adjusted alternating current power to the power system PG Therefore, it is possible to build the power supply system 1 capable of outputting alternating current power by reusing an easily available inverter or the like.

According to the present embodiment, as the batteries of the battery strings of the first power supply circuit 2 that converts the output of the first to third direct current sweep units 10 to 30 into alternating current power using the first to third inverters 50 to 70 and outputs the converted alternating current power, nickel-metal hydride rechargeable batteries having a high output density are used. Further, as the batteries B of the alternating current sweep unit 3 that outputs alternating current power from the first and second U-phase battery strings St4 and St5, and the first and second V-phase battery strings St6 and the St7, and the first and second W-phase battery strings St8 and St9, which are Y-connected, lithium-ion rechargeable batteries having a high energy density are used. Therefore, by combining the power type battery (nickel-metal hydride rechargeable battery) and the energy type battery (lithium-ion rechargeable battery) in the power supply system 1 of the present embodiment, it is possible to make each battery perform its specialty output (high output/long-term output). This makes it possible to provide the power supply system 1 having a higher output and a higher capacity at a lower cost than the power supply system using the energy type battery alone or the power type battery alone.

In the present embodiment, the alternating current sweep unit 3 outputs alternating current (three-phase AC) by Y-connecting the battery strings St, and does not use an inverter, and thus it is possible to reduce the cost.

In the present embodiment, in the first power supply circuit 2, the first direct current sweep unit 10, the second direct current sweep unit 20, and the third direct current sweep unit 30 are connected in parallel. The first to third direct current sweep units 10 to 30 are examples of the "direct current sweep unit" of the present disclosure, and the battery strings St1 to St3 are examples of the "first battery string" of the present disclosure. In the present embodiment, three direct current sweep units are connected in parallel, but the number of direct current sweep units may be one or four or more.

In the present embodiment, in the alternating current sweep unit 3, the first and second U-phase battery strings St4 and St5 are used as the U-phase battery strings, the first and second V-phase battery strings St6 and St7 are used as the V-phase battery strings, and the first and second W-phase battery strings St8 and St9 are used as the W-phase battery strings. The number of the U-phase battery strings, the V-phase battery strings, and the W-phase battery strings may be one or three or more.

In the present embodiment, ternary (NMC) lithium-ion rechargeable batteries are used for the batteries B of the first U-phase battery string St4, the first V-phase battery string St6, and the first W-phase battery string St8, and iron phosphate-based (LFP) lithium-ion rechargeable batteries are used for the batteries B of the second U-phase battery string St5, the second V-phase battery string St7, and the second W-phase battery string St9. However, any type of the lithium-ion rechargeable batteries may be used for each battery string St, and lithium-ion rechargeable batteries of each type may be mixed.

In the present embodiment, the insulating filter T1 and the insulating filter T2 include an LC filter (LCL filter) and a three-phase transformer. However, the insulating filter T1 and the insulating filter T2 may be isolation transformers having a filter function, such as a noise suppression transformer (noise cut transformer).

The embodiments disclosed herein are to be considered to be illustrative and not restrictive in every respect. The scope of the disclosure is defined not by the detailed description of embodiments but by the claims, and is intended to cover all equivalents and all modifications within the scope of the claims.

What is claimed is:

1. A power supply system comprising:
   an alternating current sweep unit configured to output alternating current power from a U-phase battery string, a V-phase battery string, and a W-phase battery string that are Y-connected; and
   a first power supply circuit configured to convert an output of a direct current sweep unit including a first battery string into alternating current power using an inverter to output alternating current power, wherein:
   each of the U-phase battery string, the V-phase battery string, the W-phase battery string, and the first battery string includes a plurality of battery circuit modules connected in series;
   each of the battery circuit modules includes
      a battery,
      output terminals provided to output a voltage of the battery,
      a first switch connected to the output terminals and connected in parallel to the battery, and
      a second switch connected in series to the battery, the battery circuit modules each being configured such that the voltage of the battery is applied to the output terminals when the first switch is in an OFF state and the second switch is in an ON state;
   the first power supply circuit is connected to an external power supply through a first insulating filter;
   the alternating current sweep unit is connected to the external power supply through a second insulating filter; and
   a circuit capacity of the second insulating filter is smaller than a circuit capacity of the first insulating filter.

2. The power supply system according to claim 1, wherein an output density of the battery included in the first battery string is higher than an output density of the battery included in the U-phase battery string, the V-phase battery string, and the W-phase battery string.

3. The power supply system according to claim 2, wherein an energy density of the battery included in the U-phase battery string, the V-phase battery string, and the W-phase battery string is higher than an energy density of the battery included in the first battery string.

4. The power supply system according to claim 2, wherein:
   the battery included in the first battery string is a nickel-metal hydride battery; and
   the battery included in the U-phase battery string, the V-phase battery string, and the W-phase battery string is a lithium-ion battery.

5. The power supply system according to claim 1, further comprising a control device configured to control the alternating current sweep unit and the first power supply circuit, wherein the control device is configured to:
   control the alternating current sweep unit and the first power supply circuit to perform power adjustment on the external power supply by input and output power of the alternating current sweep unit and the first power supply circuit; and control connection and disconnection between the alternating current sweep unit and the external power supply and connection and disconnection between the first power supply circuit and the external power supply depending on a response time and an adjustment time requested in the power adjustment.

6. The power supply system according to claim 5, wherein the control device is configured to:

operate the first power supply circuit and connect the first power supply circuit to the external power supply, when adjustment request is a frequency adjustment capability is requested for the power adjustment; and operate the alternating current sweep unit and connect the alternating current sweep unit to the external power supply, when a supply and demand adjustment capability is requested for the power adjustment.

* * * * *